United States Patent
Gonda et al.

(10) Patent No.: US 8,161,188 B2
(45) Date of Patent: Apr. 17, 2012

(54) DEVICES AND METHODS FOR PROVIDING NETWORK ACCESS CONTROL UTILIZING TRAFFIC-REGULATION HARDWARE

(75) Inventors: Oded Gonda, Tel Aviv (IL); Yaron Sheffer, Tel Aviv (IL)

(73) Assignee: Check Point Software Technologies, Ltd, Tel Aviv (IL)

( * ) Notice: Subject to any disclaimer, the term of this patent is extended or adjusted under 35 U.S.C. 154(b) by 514 days.

(21) Appl. No.: 12/114,778

(22) Filed: May 4, 2008

(65) Prior Publication Data

US 2009/0276538 A1    Nov. 5, 2009

(51) Int. Cl.
*G06F 15/173* (2006.01)
(52) U.S. Cl. ........................................ 709/238; 709/232
(58) Field of Classification Search .................. 709/238, 709/224–225, 232; 726/22–27; 370/230, 370/235
See application file for complete search history.

(56) References Cited

U.S. PATENT DOCUMENTS

| | | |
|---|---|---|
| 6,570,884 B1 | 5/2003 | Connery et al. |
| 2001/0026557 A1* | 10/2001 | Gaedeken et al. ............ 370/442 |
| 2002/0149602 A1 | 10/2002 | Redpath et al. |
| 2007/0130624 A1 | 6/2007 | Shah et al. |
| 2009/0027057 A1* | 1/2009 | Anderson et al. ............. 324/457 |
| 2009/0158435 A1* | 6/2009 | Milliken et al. ............... 726/24 |
| 2009/0172817 A1* | 7/2009 | Sedayao ......................... 726/25 |

FOREIGN PATENT DOCUMENTS

CN    1518289    8/2004

* cited by examiner

*Primary Examiner* — Patrice Winder
*Assistant Examiner* — Ebrahim Golabbakhsh
(74) *Attorney, Agent, or Firm* — Mark M Friedman

(57) ABSTRACT

Disclosed are devices and methods for providing network access control utilizing traffic-regulation hardware, the device including: at least one client-side port for operationally connecting to a client system; at least one network-side port for operationally connecting to a network; a logic module for regulating network traffic, based on device-related data, between the ports, the logic module including: a memory unit for storing and loading the device-related data; and a CPU for processing the device-related data; and at least one relay, between at least one respective client-side port and at least one respective network-side port, configured to open upon receiving a respective network-access-denial command from the logic module. Preferably, the logic module is configured to maintain an open-relay line-rate when at least one relay is open, and to maintain a closed-relay line-rate when at least one relay is closed.

14 Claims, 3 Drawing Sheets

DEVICES AND METHODS FOR PROVIDING NETWORK ACCESS CONTROL UTILIZING TRAFFIC-REGULATION HARDWARE

FIELD AND BACKGROUND OF THE INVENTION

The present invention relates to devices and methods for providing network access control utilizing traffic-regulation hardware.

In recent years, security has become an increasing concern in information systems. This issue has become more significant with the advent of the Internet and the ubiquitous use of network environments (e.g. LAN and WAN). Methods that regulate network access based on network traffic have primarily used software solutions. A hardware solution can offer better tamper-proof performance in an inexpensive, low-profile unit. Such a solution would require minimal management infrastructure and no need for maintenance.

In the prior art, there are known network connectors, for protecting against unauthorized access, which can send unauthenticated traffic to a "substitution" device. Other methods include filtering based on an Ethernet exchanger and receive filtering using a hardware-based limited packet filter. However, techniques for providing network access control utilizing traffic-regulation hardware are not known in the art.

It would be desirable to have devices and methods for providing network access control utilizing traffic-regulation hardware.

SUMMARY OF THE INVENTION

It is the purpose of the present invention to provide devices and methods for providing network access control (NAC) utilizing traffic-regulation hardware.

For the purpose of clarity, the term "NAC device" is used herein to refer to a hardware device that provides network access control utilizing traffic-regulation hardware. The term "zeroize" is used herein to refer to resetting the NAC device to its initialization mode.

Preferred embodiments of the present invention provide solutions to NAC problems via a small embedded device that can be installed in-line on an Ethernet cable between a client system and an access switch, typically inserted into a switch port. The device includes one or more hardware relays. Each relay controls exactly one physical line (e.g. 100 Mb or 1 Gb Ethernet). When the relay is open, network traffic only flows through a packet filter, which may be implemented in software or hardware. This mode may be slower than the full rate of the network line. When the relay is closed, traffic flows freely.

When the relay is closed and traffic flows at full speed, the device checks for specially-formatted "alert" packets. When such an alert packet is detected, the device automatically opens the relay, and resumes packet inspection and filtering. The device may be powered by a battery, or may use power derived from the network line (e.g. Power Over Ethernet (POE)).

Therefore, according to the present invention, there is provided for the first time a device for providing network access control utilizing traffic-regulation hardware, the device including: (a) at least one client-side port for operationally connecting to a client system; (b) at least one network-side port for operationally connecting to a network; (c) a logic module for regulating network traffic, based on device-related data, between at least one client-side port and at least one network-side port, the logic module including: (i) a memory unit for storing and loading the device-related data; and (ii) a CPU for processing the device-related data; and (d) at least one relay, between at least one respective client-side port and at least one respective network-side port, configured to open upon receiving a respective network-access-denial command from the logic module.

Preferably, the device is powered by the network.

Preferably, the device further includes: (e) a battery for powering the device.

Preferably, the device further includes: (e) a reset mechanism for zeroizing the device.

Preferably, the device further includes: (e) a status indicator for indicating at least one operational status of the device.

Preferably, the device further includes: (e) a packet-matching module for detecting the device-related data from the network while the CPU is idle.

More preferably, the packet-matching module is configured to detect an alert packet from the network.

More preferably, the network-access-denial command is generated based on receiving the alert packet.

Most preferably, the non-volatile memory is configured to store a packet-filtering policy, wherein the packet-filtering policy is determined by a policy decision-point operationally connected to the network.

Preferably, the logic module is configured to maintain an open-relay line-rate when at least one relay is open, and to maintain a closed-relay line-rate when at least one relay is closed.

According to the present invention, there is provided for the first time a method for providing network access control utilizing traffic-regulation hardware, the method including the steps of: (a) operationally connecting a client-side port to a client system; (b) operationally connecting a network-side port to a network; (c) regulating network traffic, based on device-related data, between the client-side port and the network-side port; and (d) upon receiving a network-access-denial command, opening a relay between the client-side port and the network-side port.

Preferably, the method further includes the step of: (e) prior to the step of regulating, detecting the device-related data from the network.

More preferably, the step of detecting includes detecting an alert packet from the network.

More preferably, the network-access-denial command is generated based on receiving the alert packet.

Most preferably, the step of detecting the alert packet is based on a packet-filtering policy determined by a decision-point policy operationally connected to the network.

Preferably, the step of regulating includes maintaining a open-relay line-rate when the relay is open, and maintaining a closed-relay line-rate when the relay is closed.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to devices and methods for providing network access control utilizing traffic-regulation hardware. The principles and operation for providing network access control utilizing traffic-regulation hardware, according to the present invention, may be better understood with reference to the accompanying description and the drawings.

Figure 1:
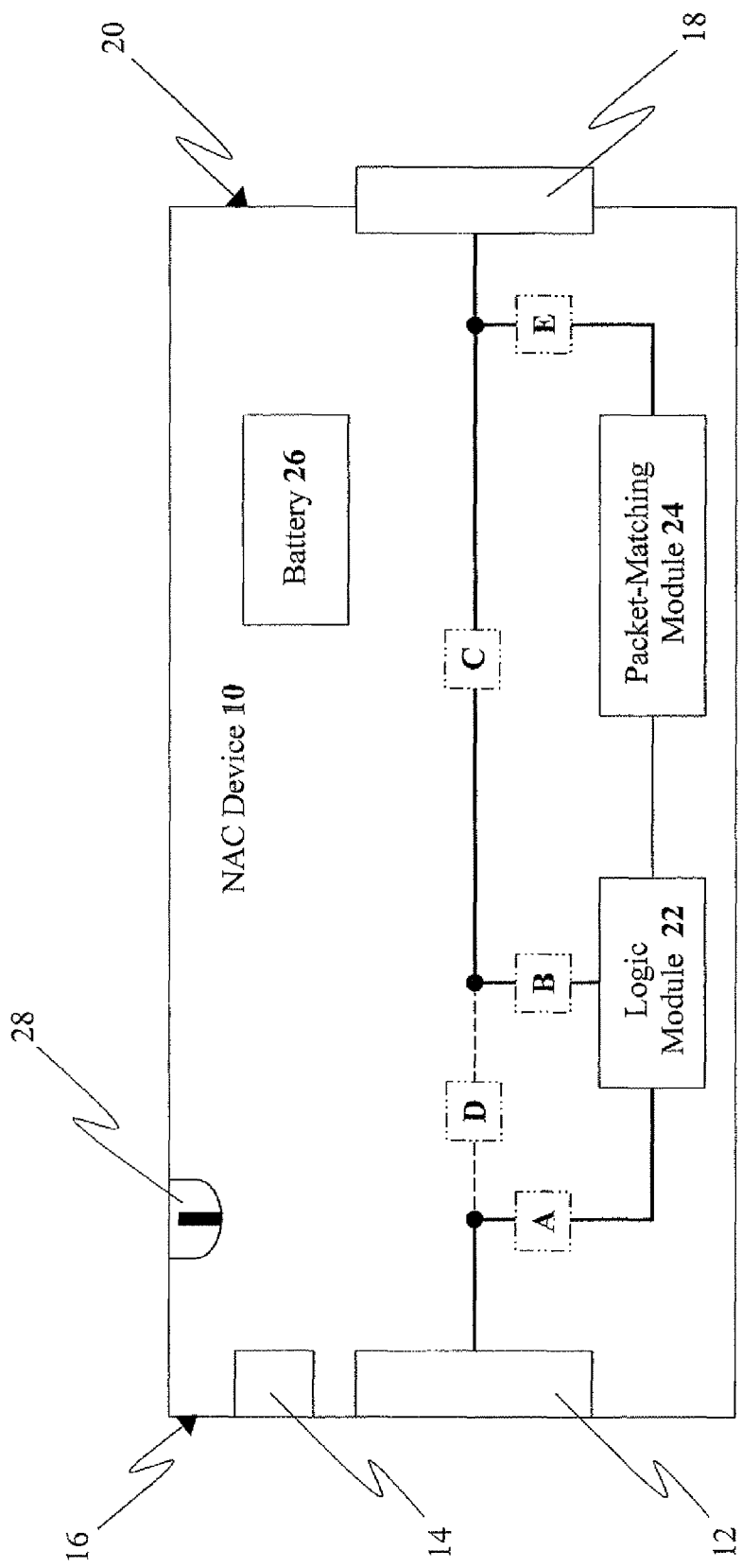
FIG. 1 is a simplified schematic block diagram of an NAC device, according to preferred embodiments of the present invention.

Referring now to the drawings, FIG. 1 is a simplified schematic block diagram of an NAC device, according to preferred embodiments of the present invention. A NAC device 10 is shown having a client port 12 and a status indicator 14 (e.g. for indicating failure or low battery) located on a client side 16. A network port 18 is shown located on a network side 20. Client port 12 can be any standard port (e.g. a female RJ-45 connector) for connecting to client systems. Network port 18 can be any standard port (e.g. a male RJ-45 connector) for connecting to a network switch. While only one port (i.e. client port 12 and network port 18) is shown in FIG. 1 on client side 16 and network side 20, it is noted that a plurality of ports can be configured into NAC device 10 on either or both sides.

A logic module 22 houses memory and processing components (e.g. CPU, RAM, flash-memory chip). A packet-matching module 24 is used for detecting alert packets in the network traffic to NAC device 10. An optional battery 26 provides power to NAC device 10. Alternatively, NAC device 10 may be powered from the network line (e.g. using POE). Since NAC device 10 is primarily a passive device, a reset button 28 is used to zeroize NAC device 10. In implementations in which battery 26 is used, NAC device 10 can report a battery level, or provide notification by activating (or deactivating) status indicator 14.

An exemplary signal-routing scheme for NAC device 10 involves a client-side line A (e.g. 10/100 Ethernet) routed to logic module 22 which can transmit signals, via a line B (e.g. 10/100 Ethernet), to a network-side line C (e.g. 10/100/1000 Ethernet). A physical relay D can serves to connect client-side line A to network-side line C and vice-versa. In implementations having a plurality of ports, a plurality of respective relays D is implemented as well. A line E (e.g. 10/100/1000 Ethernet) can transmit signals from packet-matching module 24 to network-side line C. The protocol for allowing the routing of various signal paths is described below in regard to FIG. 3.

Line speed can be renegotiated without disconnecting a port. This prevents an end user from seeing indications that the port is disconnecting and reconnecting frequently. In addition, NAC device 10 can maintain different line rates at different times (e.g. a higher one when relay D is closed, and a lower rate when relay D is open).

Figure 2:
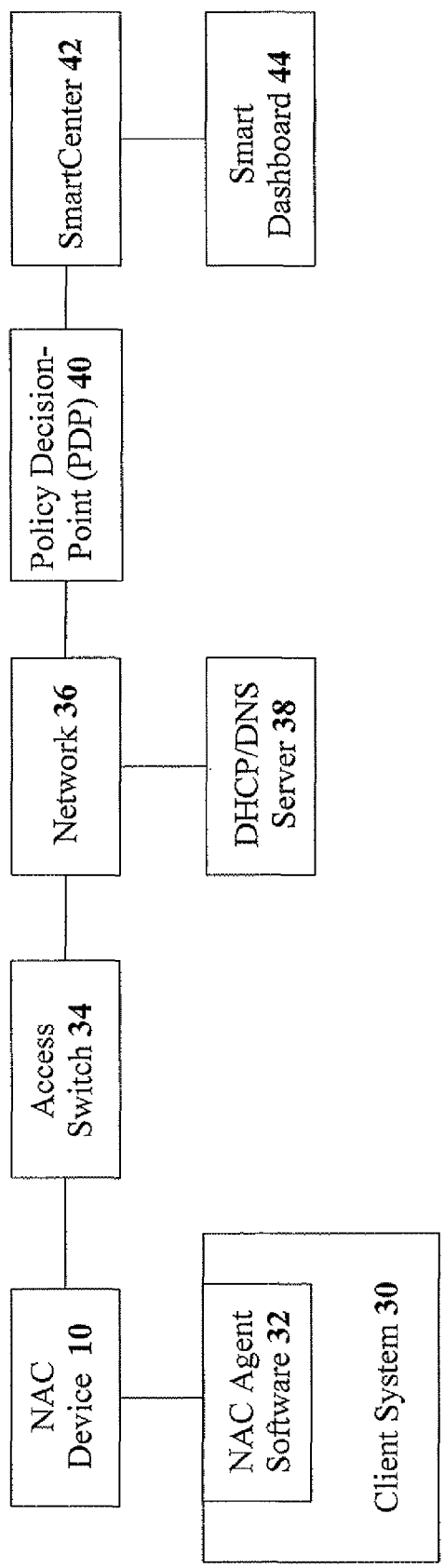
FIG. 2 is a simplified schematic block diagram of the NAC device of FIG. 1 implemented in a typical network-architecture configuration, according to preferred embodiments of the present invention.

FIG. 2 is a simplified schematic block diagram of the NAC device of FIG. 1 implemented in a typical network-architecture configuration, according to preferred embodiments of the present invention. A client system 30 (e.g. a PC) is shown having NAC agent software 32. Client system 30 is operationally connected to client port 12 of NAC device 10. An access switch 34 is operationally connected to network port 18 of NAC device 10. Access switch 34 is operationally connected to a network 36.

Network 36 can be a switched or routed network, and is typically connected to a DHCP/DNS server 38. Network 36 is connected to a policy decision-point (PDP) 40 which is connected to security management servers. In preferred embodiments of the present invention, these servers are known as SmartCenter 42 and SmartDashboard 44. Specifically, SmartDashboard 44 is a graphical management console, and SmartCenter 42 is a security management server, which stores and distributes the management configuration. SmartCenter 42 and smart dashboard 44 determine the access-control policy, which is jointly enforced by NAC device 10 and by PDP 40.

Packet-matching module 24 is only active when relay D is open. In such a state, there is no direct (i.e. transparent) connectivity between client port 12 and network port 18. All traffic is inspected by logic module 22 in this state. A packet-filtering policy (PFP) determines which network traffic is allowed in this state. The allowed traffic is typically only security-related (i.e. authentication) traffic. When relay D is closed, traffic flows too fast for logic module 22 to keep up. In such a scenario, logic module 22 enters an idle state until receiving an alert packet from PDP 40.

Figure 3:
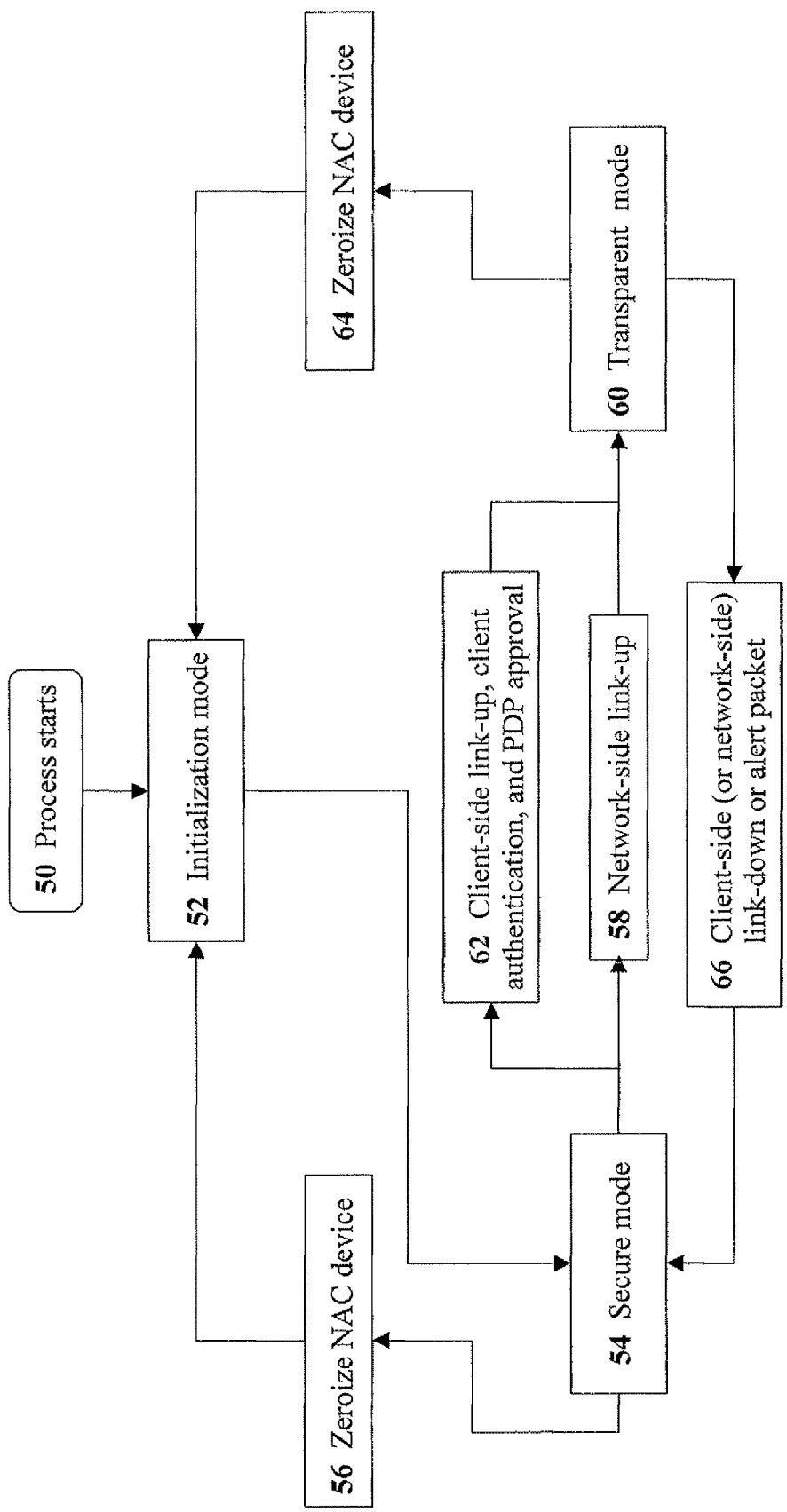
FIG. 3 is a simplified operational scheme of the initialization and operational modes for the NAC device of FIG. 1, according to preferred embodiments of the present invention.

FIG. 3 is a simplified operational scheme of the initialization and usage modes for the NAC device of FIG. 1, according to preferred embodiments of the present invention. The process starts (Block 50), for first-time usage, with NAC device 10 in an "initialization" mode (block 52). Initialization can take place in the operational location (e.g. connected to NAC agent software 32 and/or access switch 34 of FIG. 2) of NAC device 10, or NAC device 10 can be initialized in a more secure location, and then moved to its operational location. NAC device 10 then enters a "secure mode" (Block 54). The secure mode is a state in which no direct network traffic is allowed between client system 30 and network 36. NAC device 10 can be zeroized (block 56), by activating reset button 28, in order to return NAC device 10 to initialization mode (block 52).

As part of a network-side link-up (Block 58), NAC device 10 then acquires an IP address from DHCP server 38 or through other means. To determine PDP 40, NAC device 10 queries DNS server 38 for an SRV (i.e. service) record, or discovers PDP 40 by other means. NAC device 10 connects to PDP 40 (e.g. by SSL), and receives the public key of PDP 40. NAC device 10 stores the public key, which cannot be changed for the lifetime of NAC device 10, in logic module 22.

NAC device 10 is only willing to communicate with a PDP 40 that presents the stored public key. NAC device 10 also receives the PDP from PDP 40. NAC device 10 receives the contents of an alert packet from PDP 40. The PFP can be stored for an extended period of time in order to handle intermittent PDP failures NAC device 10 then enters a "transparent" mode (Block 60). The transparent mode is a state in which network traffic is allowed between client system 30 and network 36, unless a PDP alert packet is received by NAC device 10. NAC device 10 can be zeroized (block 64), by activating reset button 28, in order to return NAC device 10 to initialization mode (block 52).

As part of a client-side link-up, client authentication, and PDP approval (Block 62), client system 30, via NAC agent software 32 and NAC device 10, authenticates itself to PDP 40. Such traffic (i.e. authentication traffic) is allowed by the PFP of NAC device 10. If authentication is successful, PDP 40 connects to NAC device 10, and instructs NAC device 10 to close relay D. NAC device 10 then enters transparent mode (Block 60).

Client system 30 can be disconnected from network 36 either due to a client-side (or network-side) link-down or alert packet (Block 66). A client-side link-down occurs when the client-side link is broken. A network-side link-down occurs when the network-side link is broken. In the case that PDP 40 sends an alert packet to NAC device 10, client system 30 is also disconnected. If client system 30 is disconnected, NAC device 10 goes into secure mode (Block 56). In such a situation, NAC device 10 requests a new PFP from PDP 40. Until a new PFP is received, NAC device 10 uses the cached PFP stored in logic module 22. If client system 30 is disconnected due to an alert packet, client system 30 will try to remediate its situation, and eventually will re-authenticate.

The alert packet uses a special frame to allow PDP 40 and/or client agent software 32 to alert NAC device 10. This is similar to Wake-On-LAN (WOL), and can be similarly implemented. In such a configuration, NAC device 10 continuously "sniffs" the traffic when relay D is closed. WOL uses a "magic" UDP (layer 3) packet, which can be detected and routed by packet-matching module 24 of NAC device 10. Such a UDP packet is also a broadcast packet, since NAC device 10 may not have an IP address at the time that the packet is received (e.g. a DHCP lease may have expired), and is only able to receive broadcast packets at this stage.

To protect against potential denial of service attacks, the alert packet should include some secured data. Either a nonce (i.e. cryptographic nonce in which a number or bit string is used only once in security engineering) can be allocated dynamically by PDP 40, or the nonce can be static for each NAC device 10 (e.g. a hash of the MAC value and a secret value).

A "failure" mode (not shown in FIG. 3) can be indicated by status indicator 14. The failure mode triggers a "fail-open" behavior for relay D, meaning that there is network connectivity. Such a failure mode applies to both software/firmware and hardware failures.

While the invention has been described with respect to a limited number of embodiments, it will be appreciated that many variations, modifications, and other applications of the invention may be made.

What is claimed is:

1. A device for providing network access control utilizing traffic-regulation hardware, the device comprising:
    (a) at least one client-side port for operationally connecting to a client system;
    (b) at least one network-side port for operationally connecting to a network;
    (c) a logic module for regulating network traffic, based on device-related data, between said at least one client-side port and said at least one network-side port, said logic module including:
        (i) a memory unit for storing and loading said device-related data; and
        (ii) a CPU for processing said device-related data; and
    (d) at least one relay, between respective said at least one client-side port and respective said at least one network-side port, configured to open upon receiving a respective network-access-denial command from said logic module;
wherein said logic module is configured to maintain an open-relay line-rate greater than zero for all of said network traffic when said at least one relay is open, and to maintain a closed-relay line-rate for all of said network traffic when said at least one relay is closed.

2. The device of claim 1, wherein the device is powered by said network.

3. The device of claim 1, the device further comprising:
    (e) a battery for powering the device.

4. The device of claim 1, the device further comprising:
    (e) a reset mechanism for zeroizing the device.

5. The device of claim 1, the device further comprising:
    (e) a status indicator for indicating at least one operational status of the device.

6. The device of claim 1, the device further comprising:
    (e) a packet-matching module for detecting said device-related data from said network while said CPU is idle.

7. The device of claim 6, wherein said packet-matching module is configured to detect an alert packet from said network.

8. The device of claim 7, wherein said network-access-denial command is generated based on receiving said alert packet.

9. The device of claim 8, wherein said non-volatile memory is configured to store a packet-filtering policy, wherein said packet-filtering policy is determined by a policy decision-point operationally connected to said network.

10. A method for providing network access control utilizing traffic-regulation hardware, the method comprising the steps of:
    (a) operationally connecting a client-side port to a client system;
    (b) operationally connecting a network-side port to a network;
    (c) regulating network traffic, based on device-related data, between said client-side port and said network-side port; and
    (d) upon receiving a network-access-denial command, opening a relay between said client-side port and said network-side port;
    wherein said step of regulating includes maintaining a open-relay line-rate greater than zero for all of said network traffic when said relay is open, and maintaining a closed-relay line-rate for all of said network traffic when said relay is closed.

11. The method of claim 10, the method further comprising the step of:
    (e) prior to said step of regulating, detecting said device-related data from said network.

12. The method of claim 11, wherein said step of detecting includes detecting an alert packet from said network.

13. The method of claim 12, wherein said network-access-denial command is generated based on receiving said alert packet.

14. The method of claim 13, wherein said step of detecting said alert packet is based on a packet-filtering policy determined by a decision-point policy operationally connected to said network.

* * * * *